H. D. Dunbar,
Steam-Engine Piston.
No. 38,890. Patented June 16, 1863.
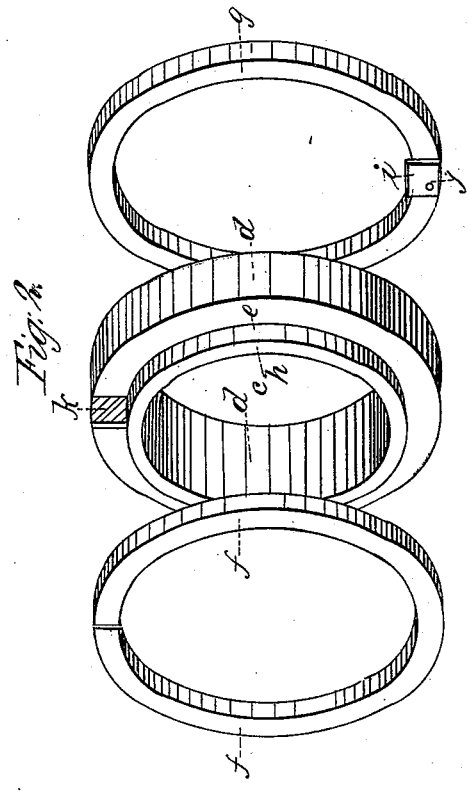
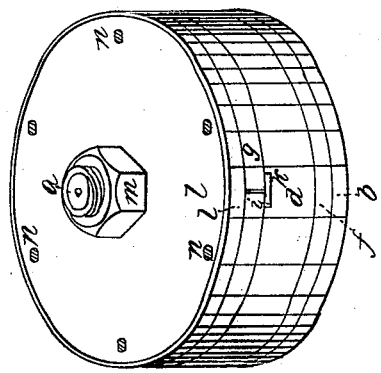
Inventor
Henry D. Dunbar
By atty. A. B. Stoughton.

UNITED STATES PATENT OFFICE.

HENRY D. DUNBAR, OF HARTLAND, VERMONT.

IMPROVEMENT IN PISTONS FOR STEAM-ENGINES.

Specification forming part of Letters Patent No. 38,890, dated June 16, 1863.

*To all whom it may concern:*

Be it known that I, HENRY D. DUNBAR, of Hartland, in the county of Windsor and State of Vermont, have invented a new and useful Improvement in Pistons for Steam-Engines; and I do hereby declare that the following is a full, clear, and exact description of the construction and operation thereof, reference being had to the accompanying drawings, making a part of this specification, in which—

Figure 1 represents a perspective view of the piston, and Fig. 2 represents in perspective the solid and the cut rings detached and separated from each other.

Similar letters of reference, where they occur in the separate figures, denote like parts of the piston in all cases.

My invention relates to that class of pistons in which the cut or packing rings are driven out by steam to make them fit the cylinder; and the nature of my invention consists in the manner in which I pack or cover the joints in the cut rings and fit them to the solid ring or hub of the piston.

To enable others skilled in the art to make and use my invention, I will proceed to describe the same with reference to the drawings.

The piston rod $a$ has a disk, $b$, fastened or wrought upon it, and also a solid hub that will fit snugly the opening $c$ in the solid ring $d$. The solid ring $d$ is recessed on both of its sides, as shown at $e$, so as to receive the two cut rings, $f g$, which slip over the flanges $h$ of the solid ring $d$. Each of the cut rings $f g$ have at their slot or slots a plate, $i$, which is pivoted at one side of the slot, as at $j$, so that when in their recessed seats $k$ they may allow the rings to expand or contract without binding or cramping them.

These pieces thus constructed and placed, as shown in Fig. 1, a detached disk, $l$, is placed against them, and a nut, $m$, run onto the shank or end of the piston-rod $a$, which perfects the piston. The disks $b l$ are each furnished with openings $n n$, &c., to admit steam under the rings $f g$ to force them out against the cylinder. I have shown but one cut in each of the rings $f g$. There may of course be more, but each covered by a pivoted plate, $i$, and for each plate there should be a recess, $k$, in the uncut ring $d$. By the use of the plate $i$ and the recess $k$ at the joints or cuts of the packing-rings, said joints may open more or less without allowing the steam to pass through. The plates may be put upon the uncut ring and the recesses in the cut rings without changing the character of the invention; but I prefer to make and use them as shown, as being more easily fitted together.

Having thus fully described my invention, what I claim is—

1. Covering the cuts of packing-rings by flat plates fastened at one side of the cut and fitting said plates into recesses in the uncut ring, for the purpose of preventing the passage of steam through the joints, substantially as described.

2. In combination with plates for covering the cuts in packing-rings, the pivoting of said plates to one side of the cut, and so that when in their recesses they will allow the rings to move upon them as they expand or contract, substantially as described.

HENRY D. DUNBAR.

Witnesses:
  A. B. STOUGHTON,
  J. W. LABARN.